United States Patent [19]
Yuker

[11] 3,899,037
[45] Aug. 12, 1975

[54] CHASSIS APPARATUS FOR ALL TERRAIN VEHICLES

[76] Inventor: Paul A. Yuker, 1408 Josephine St., Waukesha, Wis. 53186

[22] Filed: July 16, 1973

[21] Appl. No.: 379,250

[52] U.S. Cl. ................. 180/6.48; 180/41; 280/6 H; 280/6.11; 280/34 R; 280/43.23
[51] Int. Cl.² ..................... B62D 11/02; B60S 9/12
[58] Field of Search ................... 180/41, 44 F, 6.48; 280/6 H, 6 R, 43.23, 34 R, 6.11

[56] References Cited
UNITED STATES PATENTS

| | | | |
|---|---|---|---|
| 2,936,034 | 5/1960 | Lely et al. | 180/41 |
| 2,940,769 | 6/1960 | Taylor | 280/43.23 |
| 3,198,277 | 8/1965 | Trivero | 180/41 |
| 3,306,390 | 2/1967 | Jamme | 180/41 X |
| 3,309,097 | 3/1967 | Seeber | 180/41 X |
| 3,642,300 | 2/1972 | Klopp | 280/43.23 |
| 3,712,404 | 1/1973 | Walquist | 180/41 |
| 3,777,919 | 12/1973 | Konijn | 280/150.5 |

*Primary Examiner*—Kenneth H. Betts
*Attorney, Agent, or Firm*—Fred Wiviott

[57] ABSTRACT

A chassis for a four wheeled vehicle has an articulating linkage supporting each wheel for selectively moving the individual wheels independently into and away from the vehicle frame and also for selectively varying the vertical position of the wheels relative to the frame. One or both of the front or back pairs of wheels are independently driven by reversible hydraulic motors and the vehicle is directionally controlled by differentially driving wheels on opposite sides of the vehicle. In an alternate embodiment a three wheeled vehicle chassis is provided in which the rear pair of wheels is articulatingly supported for independent vertical and horizontal movement relative to the frame while the front wheel is vertically movable relative to the frame and is pivotable about a vertical axis for steering the vehicle. A mechanism is also provided for automatically varying the vertical position of wheels on opposite sides of the vehicle in response to changes in the incline of the terrain over which the vehicle is traversed so as to automatically maintain the vehicle frame in a level position.

13 Claims, 11 Drawing Figures

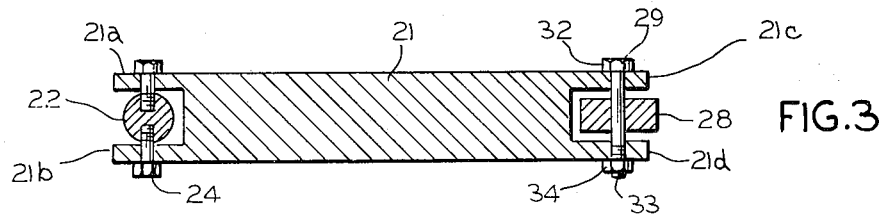
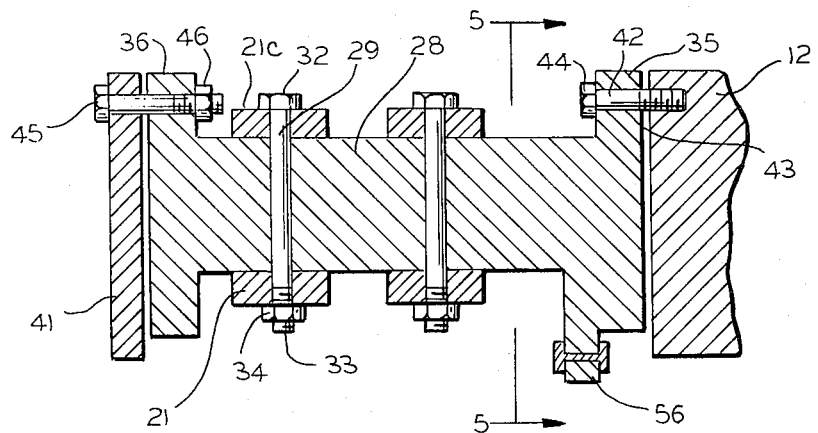
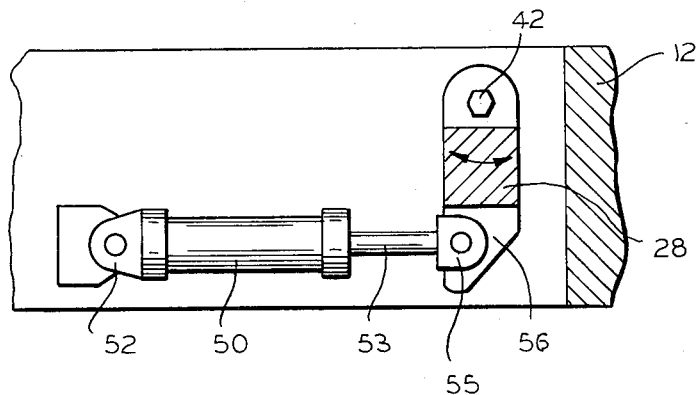
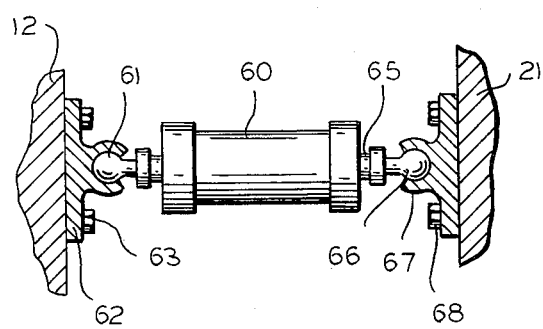

CHASSIS APPARATUS FOR ALL TERRAIN VEHICLES

BACKGROUND OF THE INVENTION

This invention relates to vehicle chassis and in particular to vehicle chassis which are adapted for traversing terrain of varying contour.

In vehicles which are designed for traveling over undeveloped terrain, such as where no roads exist, and where the topography is rough and uneven, the accessibility of the vehicle to certain places may be limited by the ability of the vehicle to maneuver on steep slopes without tipping or to proceed between narrow restrictions. It is therefore desirable to have a vehicle in which the wheels on opposite sides are vertically movable relative to the frame and to each other so as to maintain the vehicle frame in a substantially level condition while moving along a slope. Furthermore, it may be desirable to be able to vary the vehicle track, or distance between wheels on opposite sides of the vehicle for various reasons. For example, a wider track will generally give the vehicle more stability while a narrow track will enable the vehicle to pass between restrictions such as trees between which a wide tracked vehicle might not have sufficient clearance. Such vehicles have particular utility where, for example, construction is being undertaken in remote undeveloped area and where it is necessary to move heavy equipment. All-terrain vehicles have also found recent popularity as recreational vehicles.

Heretofore, the degrees of independent motion of wheels on vehicles has been limited by both technical and cost limitations. For example, while vehicles have been developed where the wheels on opposite sides of the chassis are independently movable vertically, such movement has not been combined with an ability to vary the track of the vehicle, and in vehicles wherein the track may be varied, independent vertical movement of the wheels has been lacking.

SUMMARY OF THE INVENTION

A general object of this invention is to provide an improved chassis for use on all-terrain type vehicles.

Another object of the invention is to provide a vehicle chassis which may be maintained in a relatively level position on uneven ground by independently adjusting the vertical height of the vehicle wheels.

A further object of the invention is to provide a vehicle chassis having wheels which are independently positionable relative to the vehicle frame.

Still another object of the invention is to provide a vehicle chassis which may be automatically maintained in a level position while traversing uneven terrain.

How the foregoing and other more specific objects of the invention are achieved will be set forth in the more detailed description of the preferred embodiments of the invention taken in conjunction with the accompanying drawings. Generally, the invention comprises a vehicle chassis in which the vehicle wheels are independently movable both vertically and horizontally relative to the vehicle frame. A linkage system is provided for moving the wheels horizontally without changing the relative direction of the wheel axes. An automatic leveling device may be employed for automatically raising or lowering wheels on opposite sides of the chassis to maintain the vehicle in a relatively level position when traversing sloping terrain.

DESCRIPTION OF THE DRAWINGS

FIG. 3 is a view taken along line 3—3 of FIG. 2;

FIG. 4 is a view taken along line 4—4 of FIG. 2;

FIG. 5 is a view taken along line 5—5 of FIG. 4;

FIG. 6 is a view taken along line 6—6 of FIG. 2;

DESCRIPTION OF THE PREFERRED EMBODIMENTS

Figure 1:
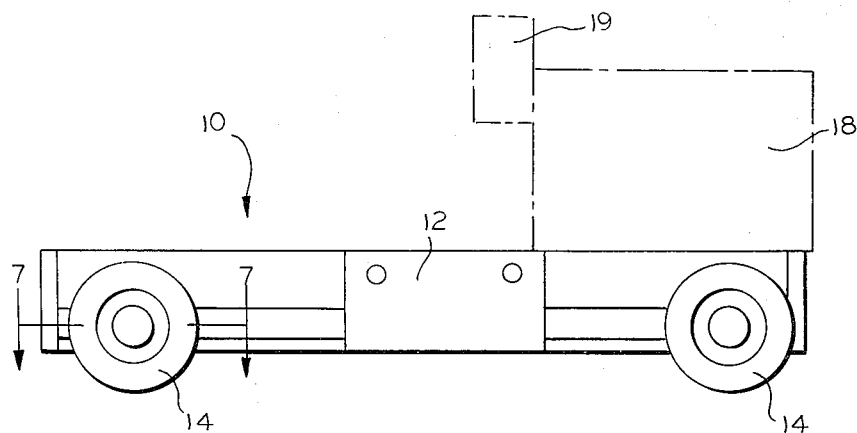
FIG. 1 is a side elevational view of a vehicle chassis according to the invention.
Figure 2:
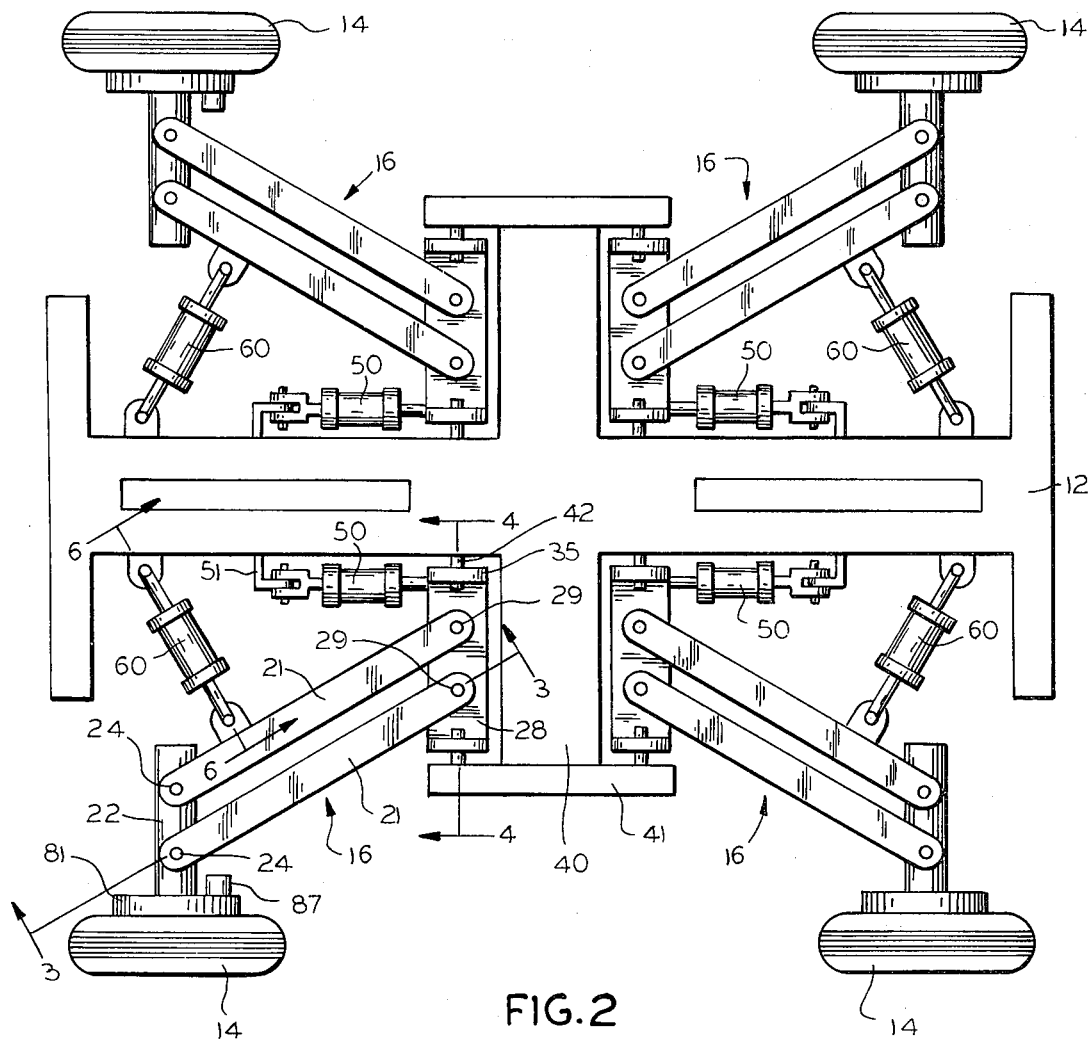
FIG. 2 is a plan view of the vehicle chassis shown in FIG. 1.

FIGS. 1 and 2 depict a vehicle chassis 10 according to the invention. The chassis 10 generally includes a central structural framework 12 which is supported on four wheels 14 by means of an articulating linkage assembly 16 associated with each wheel 14 and frame 12. The frame 12 may serve as a support for a power section 18 depicted in phantom in FIG. 1 and a control box 19 also shown in phantom. Other items, not shown such as body, driver's seat, etc. may be supported on frame 12 in a conventional manner.

The articulating linkages 16 and their associated components which will be described hereinafter, are identical for all four wheels 14 of the chassis 10 so that only one need be described. As is best seen in FIGS. 2 and 3 each articulating linkage 16 includes a pair of spaced parallel beams 21 which extend generally horizontally and are pivotally connected at one end to a generally horizontally extending axle 22 which supports the wheel 14. Each beam 21 has a pair of vertically spaced fork-like upper and lower projections 21a and 21b respectively at one end and 21c and 21d at the other end. A pivotal connection between the axle 22 and each beam 21 comprises a pair of horizontally spaced vertically extending pins 24 which are threadably engaged with and extend from the top and bottom of the axle 22 and which are pivotally journaled in the upper and lower extensions 21a and 21b of each of the beams 21. The opposite ends of the beams 21 are also pivotally connected to a generally horizontal extending rocking member 28 by means of a pair of horizontally spaced vertically extending pins 29 which extend through upper and lower projections 21c and 21d of the beam ends 21. The pins 29 are suitably retained by means of an enlarged head portion 32 at their upper ends and a threaded end portion 33 which extends below the bottom of beam 21 and is suitably retained by means such as nuts 34. The vertical pins 24 on the axle 22 lie in a vertical plane which is generally perpendicular to the longitudinal axis of the frame 12. Similarly, the vertical pins 29 at the other end of the beams 21 also lie in a generally vertical plane which is also perpendicular to the longitudinal axis of the frame 12. Since the beams 21 are parallel, they will pivot simultaneously about the pins 24 and 29 and remain parallel when pivoting horizontally about the vertical pins 24 and 29. This will result in the pins 24 remaining in a plane which is always parallel to the plane containing pins 29 and which will always be perpendicular to the longitudinal axis of the frame 12, thereby enabling the axle 22 and wheel 14 to be moved in and out relative to the frame 12 without angulating the axis of axle 22 which will always remain perpendicular to the longitudinal axis of frame 12.

The horizontal rocking member 28 is also pivotally supported about a horizontal axis as seen in FIGS. 2 and 4. The rocking member 28 generally has the shape of a rectangular box and has vertically upwardly extending flanges 35 and 36 affixed to its inner and outer ends respectively. The longitudinal axis of the member 28 extends generally perpendicular to the longitudinal axis of the frame 12 and lies in the plane of vertical pins 29. The frame 12 has horizontally extending transverse members 40 extending from either side and paralleling the rocking member 28. A vertical end flange 41 is affixed to the end of each side members 40 and projects longitudinally to the front and rear of the member 40 to form a U-shaped space defined by the frame 12, member 40 and flange 41 in which the rocking member 28 is pivotally mounted. The pivotal support for member 28 comprises a first horizontally extending pin 42 which is affixed to the frame 12 and extends through an aperture 43 in the inner vertical flanged portion 35 of rocking member 28 adjacent the frame 12. The pin 42 may be threadably received in the frame 12 as shown in FIG. 3 and has a conventional bolt head portion 44 at its opposite end. The axis of the pin 42 lies in the vertical plane containing vertical pins 29. The opposite end of the rocking member 28 is also pivotally supported by a horizontal pin 45 which coaxially aligned with pin 42 and extends through flange 41 of frame 12 and through the outer vertical flange portion 36 of the rocking member 28. The pin 45 may have a head portion and a threaded end portion extending through the flange 36 of rocking member 28 which may be retained by means of a nut 46. It can thus be seen that the rocking member 28 is free to pivot about the axis of the horizontal pins 42 and 45 which will in turn move the pivotally attached beams 21 vertically up and down along with the axle 22 and wheel 14.

The means for vertically moving wheel 14 up or down is seen in FIGS. 2, 4 and 5 to include a generally horizontally extending double acting hydraulic cylinder 50 which extends generally parallel to the longitudinal axis of the frame 12. The body of cylinder 50 is pivotally attached to a bracket 51 affixed to the frame 12 by means of a clevis and horizontally extending pin assembly 52. The extensible shaft 53 of the cylinder 50 similarly has its end pivotally attached by means of a clevis and horizontal pin assembly 55 to a vertically downwardly extending tongue 56 on the inner end of the rocking member 28. The axes of the pins in the clevis assemblies 52 and 55 lie generally parallel to the axes of pins 42 and 45 and it can thus bee seen that by extending the cylinder shaft 53, as viewed in FIG. 4, the rocking member 28 will pivot in a counterclockwise direction about the axes of pins 42 and 45. Similarly, by retracting the cylinder shaft 53, the member 28 will pivot in a generally clockwise direction about the axes of pins 42 and 45. Motion of the rocking member 28 in a clockwise or counterclockwise direction will in turn cause the beams 21 to swing through a generally vertical arc up or down which in turn varies the vertical position of the wheel assembly 14 relative to frame 12.

The hydraulic lines to the cylinder 50 are omitted as these are conventional and could be connected to a suitable source of pressurized fluid, not shown, which would be provided by conventional means and could be contained, for example, in the power section 18 mounted on the chassis 10.

The means for providing horizontal articulation of linkage 16 is seen in FIGS. 2 and 6 to include a double acting hydraulic cylinder 60 which extends between the frame 12 and the inner beam 21 of the linkage 16 to a point intermediate the pivot pins 29 and 24. The body portion of the cylinder 60 has a spherical member 61 extending axially therefrom which is supported in a socket 62 which in turn is stationarily affixed to the frame 12 by means such as bolts 63. The extensible shaft 65 of cylinder 60 also has a spherical member 66 affixed thereto which is also supported in a socket member 67 stationarily affixed to the side of inner link 21 by means such as bolts 68. It will thus be seen that the spherical members 61 and 66 and sockets 62 and 67 allow for articulating motion of the cylinder 60 relative to both the frame 12 and the parallel beams 21. It will be appreciated that by extending the cylinder shaft 65, the beams 21 will be forced horizontally away from the frame 12 and will pivot about the pins 29 and similarly, by retracting the cylinder shaft 65 the beams 21 will be moved inwardly relative to the frame 12, thereby enabling the track of wheels 14 to be varied. The hydraulic piping and connections to the cylinder 60 are not shown as these may be conventional and pressurized fluid would be supplied from a source in a manner similar to that of cylinders 50.

Figure 7:
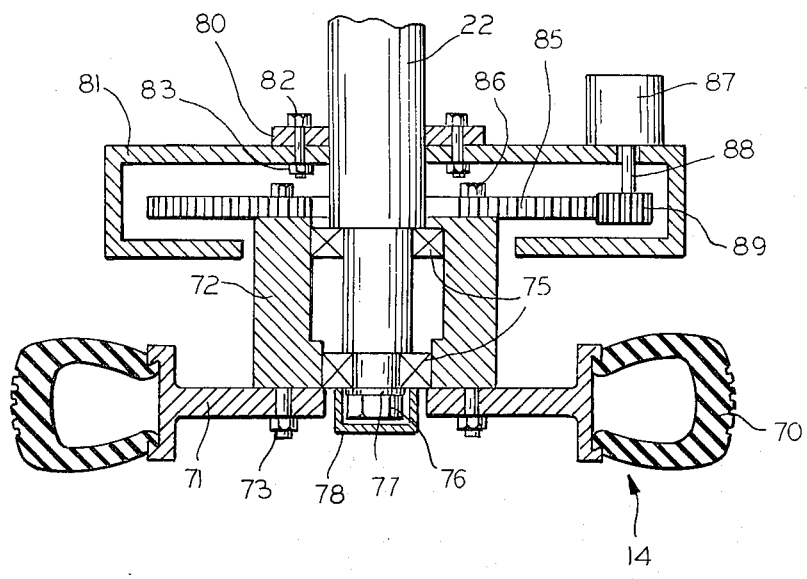
FIG. 7 is a view taken along line 7—7 of FIG. 1.

Means for driving the wheels 14 of the chassis 10 are shown in FIG. 7 and are provided at wheels 14 on opposite sides of the chassis 12 for either the rear pair of wheels 14 as shown, or the forward pair of wheels 14, or all four wheels. In addition, the drive means could be eliminated if, for example, the vehicle were designed to be towed. The drive means is identical for each wheel 14 so accordingly only one drive mechanism will be described. The wheel assembly 14 generally includes a tire 70 mounted on a wheel rim 71 which in turn is attached to a wheel hub 72 by means such as bolts 73. The wheel hub 72 is rotatably supported on the axle 22 by means such as bearings 75. The outer end of the axle 22 is threaded to receive a retainer nut 76 and washer 77 for maintaining the wheel hub 72 axially fixed upon the axle 22. A protective dust cover 78 is provided to prevent dirt and dust from contacting the bearings 75. Axially spaced from the inner end of the wheel hub 72, is an annular flange 80 which is suitably attached to the axle 22 as by welding and has a gear housing 81 attached thereto by means such as bolts 82 and nuts 83. The gear housing 81 extends radially outward from the axle 22 and defines an axially extending hollow space adjacent the end of the wheel hub 72. A gear 85 is attached to the hub 72 by means such as bolts 86 and extends radially outward within the housing 81. On the outside of the housing 81 remote from the wheel 71 and tire 70, a hydraulic motor 87 is attached which has a drive shaft 88 extending axially into the housing 81. The shaft 88 has a drive pinion 89 affixed thereto and meshes with the gear 85 for driving the hub 72 and the attached wheel 71 and tire 70. The motor 87 is a reversible servo controlled motor which may be driven at varying speeds in either direction. The gear drive is shown as merely illustrative and any other suitable drive mechanism could be provided such as sprocket and chain type drive. Again, the hydraulic supply lines to the hydraulic motor 87 are not shown, as these may be conventional and would receive pressurized hydraulic fluid from a source not shown, for driving the motor 87.

Figure 8:
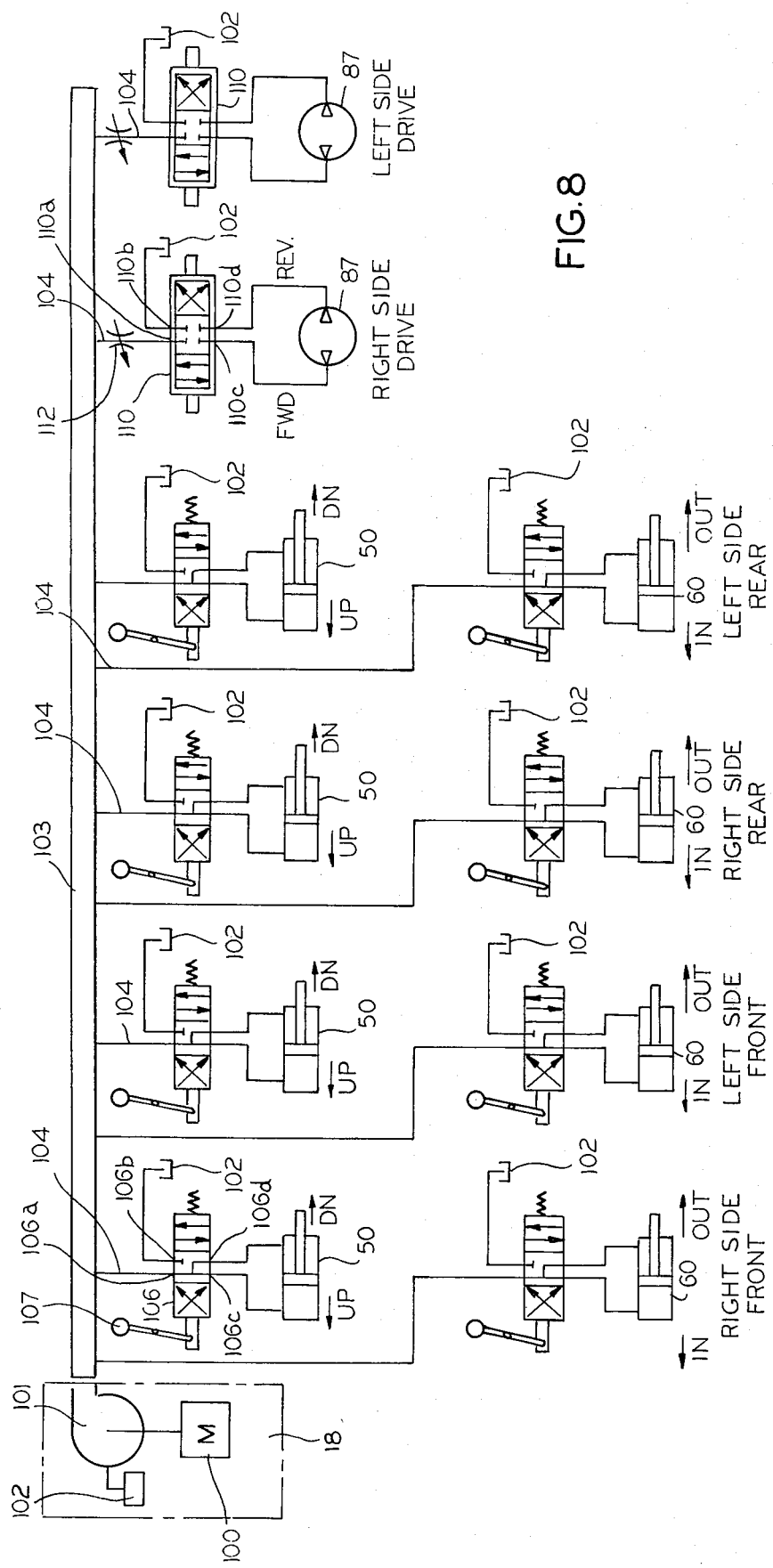
FIG. 8 is a schematic illustration of a hydraulic system for use with the invention.

FIG. 8 shows a schematic of a hydraulic system which may be used to control the apparatus shown in FIGS. 1–7. The system generally includes a prime mover 100 which drives a pump 101 employed to pressurize hydraulic fluid from a reservoir 102, all of which may be mounted in the power section box 18. The pump 101 supplies hydraulic fluid under pressure to a hydraulic manifold 103 from which pressurized hydraulic fluid is delivered by supply lines 104 to the hydraulic cylinders 50 and 60 for articulating the linkages 16 and to the drive motors 87 for driving the wheels 14. The means for controlling the motion of cylinders 50 and 60 for articulating the linkage assembly 16 is identical for each cylinder and basically comprises a solenoid valve 106 which receives fluid from the manifold 103 by line 104 to an inlet port 106a The solenoid valve 106 is spring centered to a position where fluid is directed under pressure to both sides of the cylinders 50 and 60 from ports 106c and 106d thereby providing a hydraulic lock of the cylinder under normal operations. A control lever 107 may be provided for manually actuating the valve 106 to direct fluid to one side or the other side of the hydraulic cylinders 50 and 60 and also directing fluid from the unpressurized side of the cylinder through the valve 106 to outlet port 106b and then to the reservoir 102. Thus, it may be seen that each of the cylinders 50 and 60 may be individually controlled to provide independent horizontal or vertical motion of the wheel 14.

The drive motors 87 are also supplied with fluid under pressure through solenoid valve 110 which normally take fluid under pressure from a supply line 104 from the manifold 103 and direct it to valve 110 in a normally center position to a blocked inlet port 110a. The tank port 110b is also blocked as are the forward and reverse ports 110c and 110d respectively. The valves 110 may be actuated either manually or electrically to direct fluid from the inlet ports 110a to either of ports 110c and 110d for driving the motors 87 in a forward or a reverse motion while the unpressurized ports 110c and 110d are then connected to tank 102 through outlet ports 110b. A manually operated flow control valve 112 may be provided in each supply line 104 to motors 87 for selectively varying the rate of flow to inlet port 110a of valves 110 to thereby control the speed of the associated drive motor 87. The motors 87 may be driven simultaneously or independently in either direction and at the same or differing speeds. Thus, to turn the vehicle, the right side motor 87 could be driven forward while the left side motor 87 is driven in a reverse direction or both motors 87 could be driven in the same direction at differing speeds to turn the vehicle. For straight line travel, both motors 87 are driven at the same speed and in the same direction simultaneously.

In operation of the embodiment shown in FIGS. 1–8, the prime mover 100 is started thereby driving the pump 101 and providing pressurized fluid to the manifold 103. The control levers 107 controlling each of the cylinders 50 and 60 are then actuated to position the wheels 14 in a desired postion. Actuating the cylinder 50 extends or retracts the cylinder shaft 53 thereby pivoting the rocking members 28 providing vertical positioning of the individual wheels 14 by swinging the linkage assembly 16 attached to the members 28 vertically up or down. The ball joint connections on the horizontally positioned cylinders 60 allow vertically positioning the linkage 16 and beams 21 without placing undue strain on the connections between the cylinder 60 and frame 12 or beams 21. The cylinder 60 in turn may be actuated to extend or withdraw the cylinder shaft 65 thereby moving the linkage 16 in or out relative to the vehicle frame 12 by pivoting the beams 21 about the vertical pins 24 and 29. Once the positions are set, the levers 107 are returned by spring force to a centered position whereby hydraulic fluid from line 104 is directed through the inlet ports 106a of the valves 106 to both ports 106c and 106d thereby providing fluid under pressure to both sides of the cylinders 50 and 60 and hydraulically locking linkage 16 in the selected position. Thus, the track of the vehicle is controllable by varying the position of the wheels 14 horizontally relative to the frame 12 by actuating the cylinders 60 and the height of the frame 12 is controlled by varying the vertical position of the wheels 14 by actuating the cylinders 50. Furthermore, for traversing uneven ground, the cylinders are individually operable to differentially vary the vertical positions of the wheels 14 on either side of the chassis 10. The vehicle may be moved forward by actuating the valves 110 to direct fluid under pressure from line 104 through inlet port 110a to port 110c for driving the motors 87 in a forward direction whereby the drive pinion 89 will rotate the gear 85 mounted on the wheel hubs 72, in turn rotating the wheels 71 and tires 70 about axles 22. The vehicle speed is controlled by the position of flow control valves 112 controlling the rate of flow of fluid to the individual drive motors 87.

Figure 9:
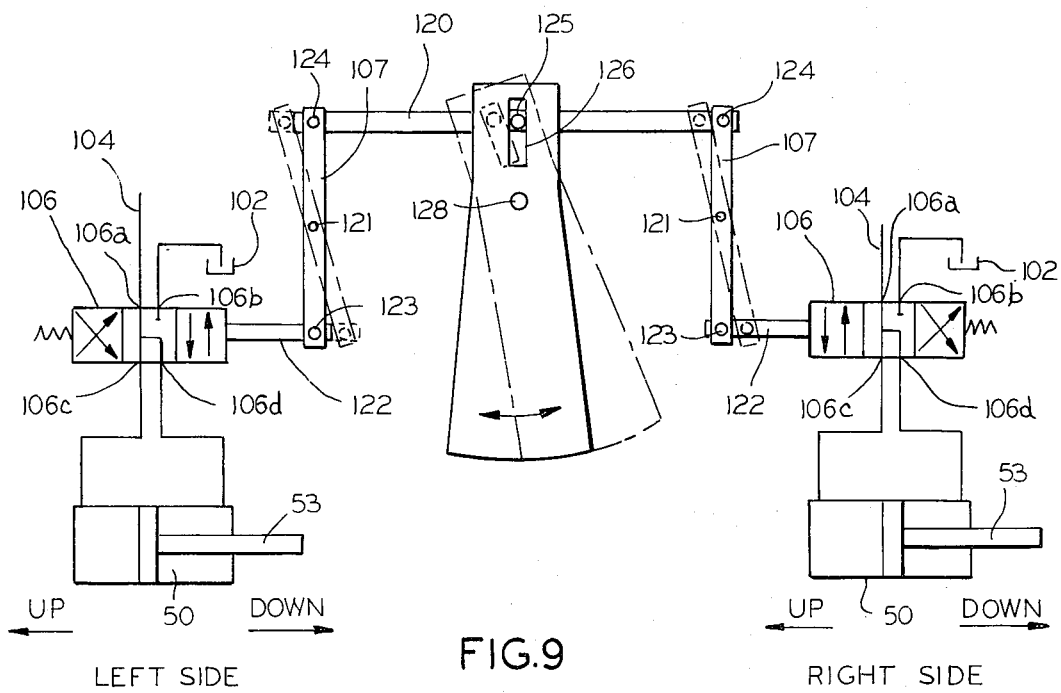
FIG. 9 is a schematic illustration of an automatic leveling device according to the invention.

A means for automatically maintaining the vehicle in a generally level position is schematically depicted in FIG. 9 in which only two of the vertical position cylinders 50 are shown with their associated control valves 106. The piping to the valve 106 is identical with that depicted in that of FIG. 8, however, the control levers 107 for the valves 106 on opposite sides of the vehicle are interconnected by means of a link member 120. As shown, each of the levers 107 pivot about a control point 121 and connect to an operating plunger 122 for each of the valves 106 by means of a pivot pin 123 at the opposite end of the levers 107. The connecting link 120 is pivotally connected to each of the levers 107 by means of a pivot pin 124. At the center of link 120 is a third pivot pin 125 which rides in a slot 126 formed in the upper portion of a pendulous weight 127 which is pivotally mounted about a pin 128 which is located between pin 125 on link 120 and the center of mass of the pendulum 127. The pin 128 has its axis generally aligned with the longitudinal axis of the vehicle such that as the vehicle travels over uneven terrain the center of mass of the pendulum 127 remains vertical due to gravity and moves to the right or left relative to the vehicle frame depending upon the incline of the vehicle. Thus if the vehicle is inclined to the right as viewed in FIG. 8, the pendulum 127 inclines to the right relative to the chassis about a point 128 due to the influence of gravity and thereby moves the link 120 connected through pin 125 and slot 126 to the left which in turn moves the levers 107 to the left to a position shown in phantom in FIG. 9. Movement of the levers 107 simultaneously varies the valve position of control valves 106 on opposite sides of the vehicle such that the right side cylinder 50 would have fluid directed from port 106a to port 106c thereby extending the cylinder shaft 53 causing the linkage 16 to move downward tending to elevate the right side of the vehicle. At the same time, the lever 107 controlling the left side cylinder 50 would cause fluid to be directed from port 106a to port 106d of the valve 106 thereby retracting the left side cylinder shaft 53 which woult tend to raise the left side wheel 14 relative to the frame 12. The net result of the simultaneously raising of the right side of frame 12 and lowering the left side of frame 12 is to level the frame 12 thereby returning the pendulum 127 to a relatively centered position which returns the control levers 107 to a neutral position for locking the cylinders 50 hydraulically. By providing a similar linkage for both the front and rear pairs of cylinders 50 on opposite sides of the vehicle chassis 10, the frame 12 may automatically be retained in a normally level position by action of the relatively swinging pendulum 127. While the leveling device has been described in considerable detail, it will be appreciated by those skilled in the art that other variations could be provided. For example, electrical controls could be used to coordinate movement of the cylinders 50.

Figure 10:
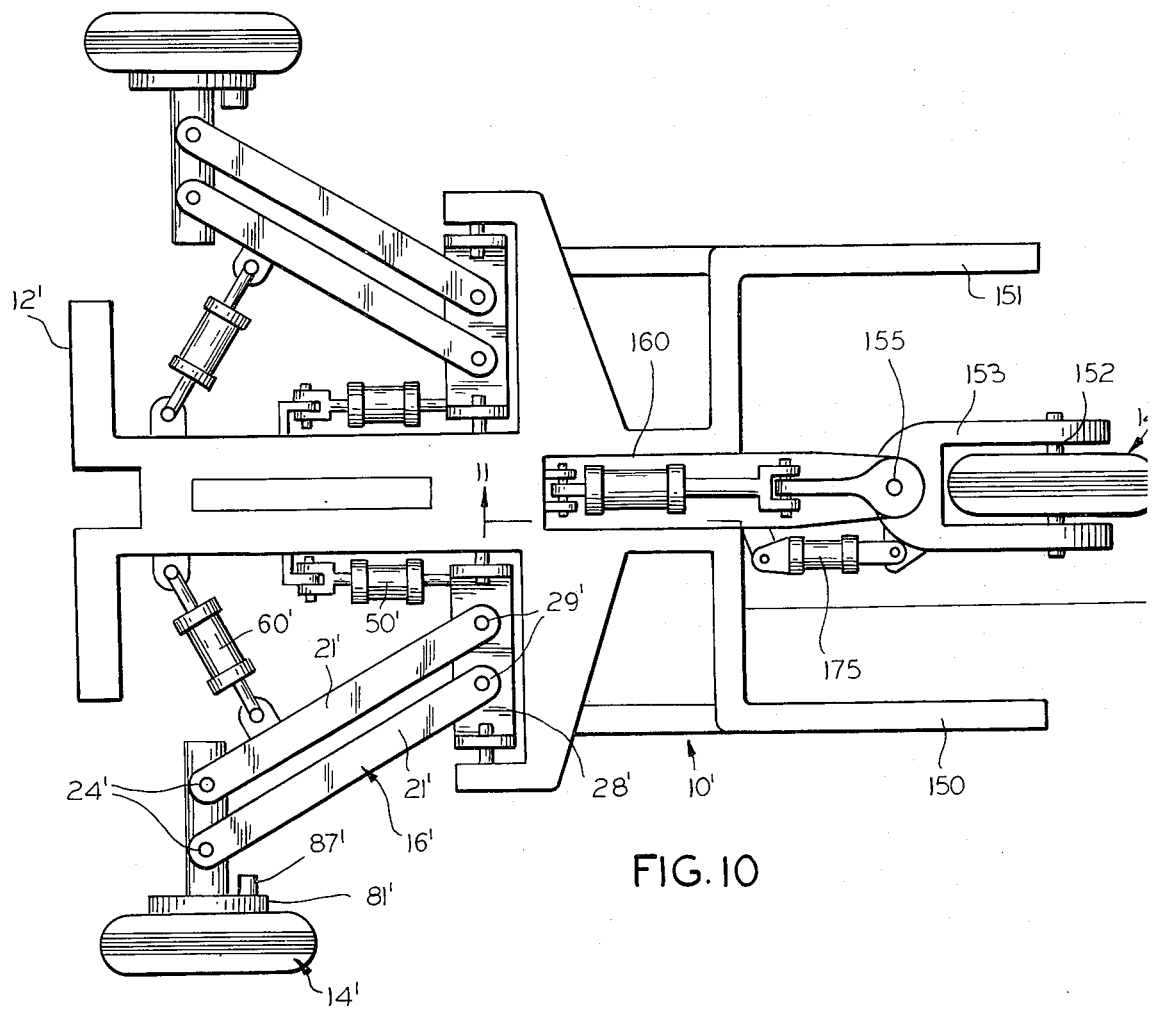
FIG. 10 is a plan view of an alternate embodiment of the invention.
Figure 11:
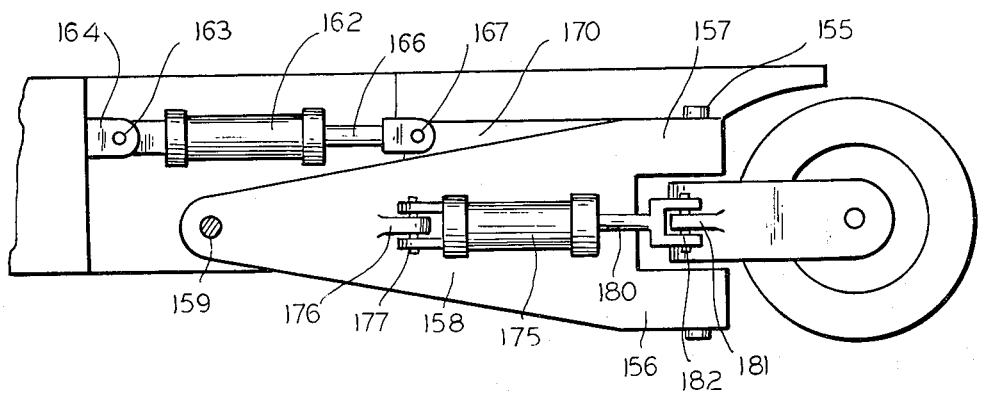
FIG. 11 is a view taken along line 11-11 of FIG. 10.

An alternate embodiment of a chassis according to the invention is seen in FIGS. 10 and 11 which shows a three wheeled vehicle chassis 10'. Since many of the parts are identical in both structure and function with those of the previously described embodiment, like reference numerals will be used for like parts with the addition of a prime. The chassis 10' consists of a tricycle type arrangement of wheels 14' in which the two rear wheels have identical articulating linkage assemblies 16' with that of the first embodiment. Accordingly, no description is necessary as to the parts and function of the rear wheel assemblies and their relation to the chassis frame 12', however, the parts are numbered for clarity.

The forward end of the frame assembly 12' includes a yoke like extension comprising spaced parallel side members 150 and 151 on the right and left side of the vehicle chassis 10' respectively. The forward wheel assembly 14' is centrally mounted between the spaced frame side members 150 and 151 and is rotatably mounted on axle 152 within a steering yoke assembly 153. The yoke assembly 153 is pivotally movable about a vertical pin 155 extending between two vertically spaced horizontally extending projections 156 and 157 on a longitudinally extending support arm 158. The support arm 158 extends longitudinally forward along the center frame 12' and terminates at a point remote from the pivot connection 155 in a vertically pivotable connection with a horizontal pin 159 extending across a slot 160 formed in the center of the framework 12'. As is seen in FIGS. 10 and 11, a longitudinally extending double-acting hydraulic cylinder assembly 162 extends within the slot 160 and is pivotally mounted on a clevis and horizontal pin assembly 163 connected to a bracket 164 affixed to the framework 12' at the end of the slot 160. The opposite end of the cylinder 162 has a shaft 166 extending therefrom which is pivotally attached by means of a clevis and horizontal pin assembly 167 to a rib 170 extending vertically along the upper edge of the support arm 158. The cylinder shaft 166 is extensible along a line which is vertically above the pivot point 159 such that extending or retracting cylinder shaft 166 will cause the support arm 158 to pivot vertically up and down about the horizontal pin 159. The hydraulic piping and connections to the cylinder 162 are omitted as they are conventional and may be supplied with pressurized fluid in a manner similar to the described with regard to the previous embodiment. A second generally horizontally extending cylinder assembly 175 is provided for steering the forward wheel. The cylinder assembly 175 has its axis generally parallel to that of the of the cylinder 162 and the longitudinal axis of the framework 12'. The cylinder 175 has its body attached to a horizontally extending bracket 176 extending from the side of the support arm 158 and is journaled for pivotal motion by means of a vertically extending clevis and pin assembly 177. The shaft end of the cylinder 175 includes an extensible shaft 180 which is also pivotally attached to a bracket 181 extending from the same side of the wheel yoke assembly 153 as that of bracket 176. A vertical pin and clevis assembly 182 provides a pivotable connection between the cylinder shaft 180 and the bracket 181. It may be seen that by extending or retracting the cylinder shaft 180 of the steering cylinder 175, the steering yoke 153 will be caused to pivot about the vertical pin 155 thereby turning the forward wheel assembly 14'. Again, the hydraulic piping and supply lines to the steering cylinder 175 are omitted as these are conventional and could be supplied in a manner similar to that of the previously described embodiment both as to controls and source of pressurized fluid.

In operation of the three wheeled vehicle chassis, the rear two wheels 14' are articulately positionable by the linkage assembly 16' in an identical manner with that of the previously described embodiment. In addition, the forward wheel assembly 14' may be vertically positioned to change the height of frame 12' by actuating the cylinder 162 to extend or retract cylinder shaft 166. The vehicle chassis 10' is steerable by virtue of the steering cylinder 175 which may be extended or retracted to turn the wheel assembly 14' pivotally about the vertical axis 155.

While several specific embodiments of the invention have thus been described, the invention is not intended to be limited thereby but is to be limited only by an interpretation of the claims which follow.

I claim:
1. A vehicle comprising:
longitudinally extending frame means,
at least three movable linkage means connected respectively to said frame means and extending from opposite sides of the longitudinal direction of said frame means,
ground engaging means affixed to each of said linkage means remote from said frame means for supporting said chassis,
first operating means comprising first extensible cylinder means articulatingly coupled with each of said linkage means for independently moving said linkage means horizontally relative to said frame means, and
second operating means comprising second extensible cylinder means operatively coupled with each of said linkage means for independently moving said linkage means vertically relative to said frame means, said second cylinder means each having one end pivotally connected to said frame means and their opposite end coupled to said linkage means rocking means associated with each of said linkage means, said rocking means being pivotally supported on said frame means about a generally horizontally extending axis which is perpendicular to the longitudinal direction of said frame means, said linkage means each being pivotally connected to their respective rocking means about axes generally perpendicular to the pivot axis of said rocking means.

2. A vehicle as set forth in claim 1 including:

control means associated with each of said first and second extensible cylinder means for selectively controlling the movement of said cylinders.

3. A vehicle as set forth in claim 2 including:

reversible drive means for operatively engaging at least two of said wheel means on opposite sides of said frame means for selectively rotating said wheel simultaneously or individually in either direction.

4. A vehicle as set forth in claim 3 including:

automatic leveling means coupled with pairs of said control means for said second cylinder means on opposite sides of said frame means for maintaining said frame means substantially level while traversing uneven terrain.

5. A vehicle comprising:

longitudinally extending frame means, a plurality of movable linkage means connected respectively to said frame means and extending from opposite sides of the longitudinal direction of said frame means, ground engaging means affixed to each of said linkage means remote from said frame means for supporting said chassis, first operating means operatively coupled with each of said linkage means for independently moving said linkage means horizontally relative to said frame means, second operating means operatively coupled with each of said linkage means for independently moving said linkage means vertically relative to said frame means, said ground engaging means comprising axle means and wheel means rotatably mounted thereon said axle means being connected to said linkage means, said axles extending generally perpendicular to the longitudinal direction of said frame means, each of said linkage means comprising a pair of spaced parallel beams each of said beam pairs being pivotally connected to their associated axle on one end and the opposite end pivotally connected to said frame means, rocking means associated with each of said link pairs, said rocking means being pivotally supported on said frame means about a generally horizontally extending axis which is perpendicular to the longitudinal direction of said frame means, said link pairs being pivotally connected to said means about axes generally perpendicular to the pivot axis of said rocking means, said first operating means comprising extensible cylinder means articulatingly connected at one end to said frame means and articulatingly connected at the opposite end to one of said links, and said second operating means comprise second extensible cylinder means having their axes generally parallel to the longitudinal axis of said frame means and being pivotally connected at one end to said frame means and pivotally connected at the opposite end to said rocking means for pivotally moving said rocking means.

6. A vehicle chassis as set forth in claim 5 including:

control means associated with each of said first and second extensible cylinder means for selectively controlling the movement of said cylinders.

7. A vehicle chassis as set forth in claim 6 including:

reversible drive means for operatively engaging at least two of said wheel means on opposite sides of said frame means for selectively rotating said wheels simultaneously or individually in either direction.

8. A vehicle chassis as set forth in claim 7 including:

automatic leveling means coupled with pairs of said control means for said second cylinder means on opposite sides of said frame means for maintaining said frame means substantially level while traversing uneven terrain.

9. A vehicle chassis as set forth in claim 8 wherein:

said automatic leveling means includes pendulum means pivotally mounted about an axis substantially parallel to the longitudinal direction of said frame means, and including means connecting said pendulum means with said pairs of control means for simultaneously varying the extension of said second cylinder means on opposite sides of said frame means so that when the second cylinder means on one side of said frame means are extended, the second cylinder means on the opposite side are retracted.

10. A vehicle chassis comprising:

generally horizontally extending frame means, a plurality of ground engaging means for supporting said frame means, at least two of said ground engaging means being axially adjacent on opposite sides of the longitudinal direction of said frame means, linkage means connecting each of said ground engaging means with said frame means, said linkage means being independently vertically pivotable relative to said frame means for selectively varying the vertical position of said ground engaging means relative to said frame means, the linkage means connected to said axially adjacent ground engaging means being independently horizontally pivotable relative to said frame means for selectively varying the horizontal position of said axially adjacent ground engaging means relative to said frame means, said ground engaging means including wheel means rotatably mounted on axles for rollingly supporting said frame means, one of said wheel means being substantially aligned with the longitudinal direction of said frame means, said one wheel being rotatable about a generally horizontal axis the linkage means connected to said one wheel including steering means, said one wheel means having its axle supported in said steering means, said steering means being horizontally pivotably connected to said linkage means whereby said wheel is directionally movable relative to said frame means for steering said chassis.

11. A vehicle chassis as set forth in claim 10 wherein: each of said horizontally pivotable linkage means comprise a pair of spaced parallel beams each of said beam pairs being pivotally connected to their associated axle on one end and the opposite end pivotally connected to said frame means.

12. A vehicle chassis as set forth in claim 11 including:
rocking member means associated with each of said beam pairs, said rocking means being pivotally supported on said frame means about a generally horizontally extending axis which is perpendicular to the longitudinal direction of said frame means, said beam pairs being pivotally connected to said rocking means about axes generally perpendicular to the pivot axis of said rocking means.

13. A vehicle chassis as set forth in claim 12 including:
reversible drive means associated with at least two of said wheel means on opposite sides of said frame means for selectively rotating said wheels simultaneously or individually in either direction.

* * * * *